United States Patent
Brooks et al.

(10) Patent No.: US 12,174,680 B2
(45) Date of Patent: Dec. 24, 2024

(54) SURGE RECOVERY WITH PROCESSOR POWER CONTROL

(71) Applicant: Hewlett-Packard Development Company, L.P., Spring, TX (US)

(72) Inventors: Robert Cleveland Brooks, Spring, CO (US); Chun Lok Ng, Spring, CO (US); Mark Andrew Piwonka, Spring, CO (US); Michael Richard Durham, Spring, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 83 days.

(21) Appl. No.: 18/000,341

(22) PCT Filed: Jun. 3, 2020

(86) PCT No.: PCT/US2020/035938
§ 371 (c)(1),
(2) Date: Nov. 30, 2022

(87) PCT Pub. No.: WO2021/247015
PCT Pub. Date: Dec. 9, 2021

(65) Prior Publication Data
US 2023/0205295 A1    Jun. 29, 2023

(51) Int. Cl.
*G06F 1/26* (2006.01)
*G06F 1/28* (2006.01)
*G06F 1/30* (2006.01)
*G06F 1/32* (2019.01)

(52) U.S. Cl.
CPC ..................................... *G06F 1/305* (2013.01)

(58) Field of Classification Search
None
See application file for complete search history.

(56) References Cited

U.S. PATENT DOCUMENTS

| 8,677,157 | B1 | 3/2014 | Sevtsenko et al. |
| 10,103,574 | B2 * | 10/2018 | Siegler ............... G06F 1/26 |
| 2005/0138438 | A1 * | 6/2005 | Bodas ............... G06F 1/3203 |
| | | | 713/300 |

(Continued)

FOREIGN PATENT DOCUMENTS

| EP | 2144346 A1 | 1/2010 |
| KR | 10-1807412 B1 | 12/2017 |
| KR | 10-1826184 B1 | 2/2018 |

*Primary Examiner* — Fahmida Rahman
(74) *Attorney, Agent, or Firm* — Quarles & Brady LLP

(57) ABSTRACT

An example non-transitory computer-readable medium includes instructions to monitor a time-averaged power consumption of a computing device that includes a plurality of power-consuming components including a processor, and compare the time-averaged power consumption to a first threshold to detect if the time-averaged power consumption exceeds the first threshold. In response to detecting that the time-averaged power consumption of the computing device exceeds the first threshold, the instructions are to decrease an operational power of the processor from a normal operating power, and start monitoring an instantaneous power consumption of the computing device to determine whether to make a further decrease or an increase to the operational power of the processor.

20 Claims, 5 Drawing Sheets

(56) References Cited

U.S. PATENT DOCUMENTS

| | | |
|---|---|---|
| 2006/0294400 A1* | 12/2006 | Diefenbaugh ........ G06F 1/3203 |
| | | 713/300 |
| 2012/0063783 A1* | 3/2012 | Vassilieva ............... H04J 14/06 |
| | | 398/152 |
| 2012/0311356 A1 | 12/2012 | Tan |
| 2013/0124885 A1 | 5/2013 | Davis et al. |
| 2014/0101475 A1* | 4/2014 | Berke ................... G06F 1/3287 |
| | | 713/340 |
| 2015/0372538 A1 | 12/2015 | Siegler et al. |
| 2017/0308136 A1 | 10/2017 | Choi et al. |
| 2018/0039322 A1 | 2/2018 | Weissmann et al. |
| 2019/0179386 A1 | 6/2019 | Wang et al. |

* cited by examiner

SURGE RECOVERY WITH PROCESSOR POWER CONTROL

BACKGROUND

Computing devices such as notebook and desktop computers, typically have a power supply that provides electrical power to operate various components of the device, such as the processor, memory, storage drives, busses, peripheral devices, and so on. A power supply may plug into a wall/main power source and convert general-purpose electrical power to the type of power used by the device.

DETAILED DESCRIPTION

The power consumption of a computing device may fluctuate over time. The power delivered by the computing device's power supply may increase when certain components are loaded and may decrease when certain components are unloaded. For example, connecting an external peripheral device to the computing device may cause a sudden demand for power from the power supply. In another example, a computationally intensive application may cause the processor of the computing device to draw increased power for a time. A computing device's power supply is often rated to deliver a specific maximum amount of power over a certain time, and exceeding the maximum may contravene the rating, may generate excessive heat, and may possibly be dangerous.

A power level of a processor may be reduced to reduce overall power consumption of a computing device, so as to maintain, over time, the overall computing device's power consumption below a rated or safe amount that can be provided by the power supply.

The operational power of the processor may be reduced when a time-averaged power consumption of the computing device exceeds a surge threshold. An initial reduction may be followed by an incremental increase or decrease of processor power to continue to end the surge while allowing the processor to still operate near expected or desired power levels. For example, if the initial reduction does not bring the instantaneous system power down sufficiently, then an additional decrement may be made to the operational power of the processor. The instantaneous system power may be checked regularly or periodically, and decrements and increments may be made to the operational power of the processor to maintain power consumption of the computing device within a band that tends to end the surge and that allows the processor to continue to operate at greater than minimum capacity. Operational power of the processor may be controlled by setting a power limit of the processor.

Accordingly, setting the processor to a very low or minimum power level, for example by asserting an emergency throttling system such as PROCHOT#, can be avoided. A user of the computing device may thus be less likely to notice a sudden decrease in performance and may not even be aware that a power surge has occurred and that recovery is underway. Further, the processor may continue to operate effectively to perform its tasks to increase the efficiency of the computing device during a surge.

Figure 1:
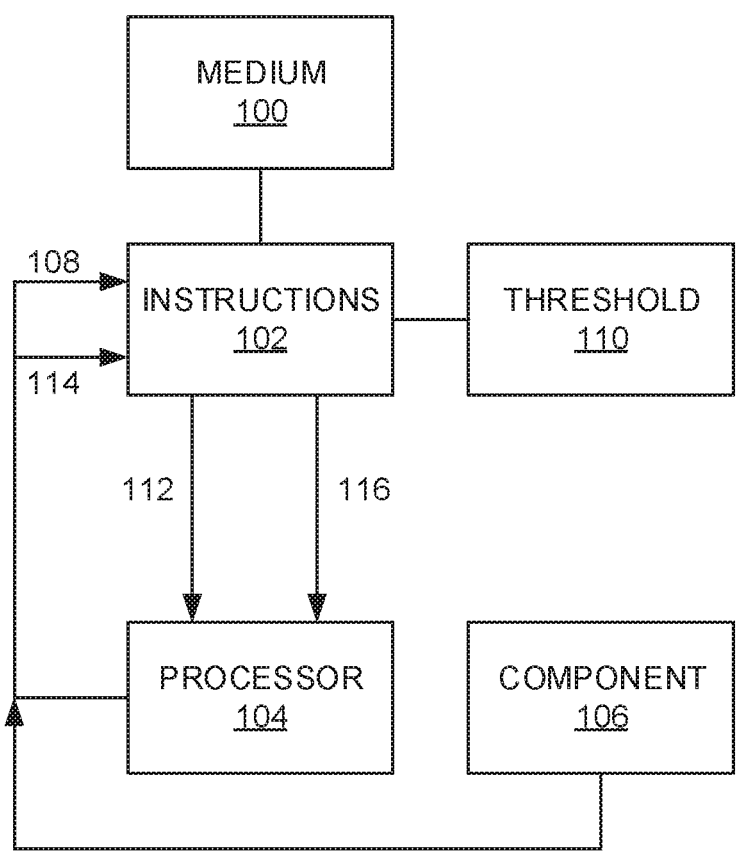
FIG. 1 is a block diagram showing example instructions to decrease processor operational power when power consumption of a computing device is excessive.

FIG. 1 shows an example non-transitory computer-readable medium 100 that includes instructions 102 to decrease processor operational power when the power consumption of a computing device is excessive. The instructions 102 further monitor the power consumption of the computing device to determine whether to further decrease or increase the operational power of the processor.

The medium 100 may be provided to a computing device, such as a desktop computer, notebook computer, server, or similar device.

The computing device includes power-consuming components, such as a processor 104, memory, graphics card or chipset, hard disc drive, network adaptor, serial bus, peripheral device, and similar components that are powered by the power supply of the computing device. These components consume various amounts of power that may differ from time to time and may vary based on usage of the computing device. In various examples, a processor and a bus that drives peripheral devices, such as a Universal Serial Bus (USB), may tend to be the largest consumers of power. For sake of simplified explanation, the processor 104 and another power-consuming component 106 are illustrated.

The instructions 102 may be executable by a processor or, equivalently, may be interpreted to generate instructions that are executable by a processor. The processor may include a central processing unit (CPU), a microcontroller, a microprocessor, a processing core, a field-programmable gate array (FPGA), an application-specific integrated circuit (ASIC), or a similar device capable of executing instructions. The processor may cooperate with the non-transitory computer-readable medium 100, which may include an electronic, magnetic, optical, or other physical storage device that encodes instructions 102. The computer-readable medium may include, for example, random access memory (RAM), read-only memory (ROM), electrically-erasable programmable read-only memory (EEPROM), flash memory, a storage drive, an optical device, or similar.

The instructions 102 may be executed by the same processor 104 for which power control is performed. The instructions 102 may be executed by a different processor, such as an embedded controller of the computing device. Execution may be distributed, in that the instructions 102 may be executed by multiple different processors.

The processor 104 has settable operational power limits that define the maximum power and/or average power that the processor 104 should draw. At any given time, the processor 104 may draw power up to a set limit. A limit may be defined by a limiting value and a time constant that defines a duration over which power readings are compared to the limiting value. The time constant may define a period for computing an average of power readings. Any number of different operational power limits may be used to control the operational power of the processor 104.

An example operational power limit of a processor 104 is a fast power limit that limits the instantaneous or near-instantaneous power draw of the processor 104. A fast power limit may consider an average power used over a very short time, such as 10 ms. A fast power limit may have a relatively high limiting value, such as 50 W, to permit transient high-power levels. Another example is a slow limit that may use a longer averaging duration, such as 10 seconds, and a lower limiting value of 40 W, for example. Still another example is a sustained power limit that considers power draw over a longer time span, such as 100 seconds, and has the lowest limiting value, such as 25 W. Selecting various time constants and limiting values allows the processor 104 to operate at high powers for short durations while limiting the overall power to a safe level. For example, a fast power limit may be set to 50 W for 10 ms and a sustained power limit may be set to 25 W, where 50 W is allowable infrequently (e.g., over 10 ms) and where 25 W can be tolerated indefinitely.

The operational power of the processor 104 may be controlled by setting an operational power limit. For example, to reduce operational power, the time constant of a sustained power limit may be changed from 100 seconds to 1 second. Incrementing and decrementing an operational power may be achieved by raising and lowering a limiting value, respectively. Any suitable time constant and/or limiting value may be set to change the operational power of the processor 104.

The normal operating power of the processor 104 may be established by an operational power limit or set of limits, as discussed above. A reduced operating power of the processor 104 may be established by setting an operational power limit or set of limits, as discussed above, that provides less power than the normal operating power.

The instructions 102 monitor a time-averaged power consumption 108 of the computing device. This power draw includes power consumed by the processor 104 and other power-consuming components 106 and may be the total power outputted by the power supply of the computing device. Time averaging may be performed over any suitable time, such as 5 seconds, 10 seconds, or 15 seconds. The time-averaged power consumption 108 may be used to detect a power surge and may be referred to as a surge function.

The instructions 102 compare the time-averaged power consumption 108 to a first threshold 110 to detect if the time-averaged power consumption 108 exceeds the first threshold 110. The first threshold 110 may be referred to as an upper surge threshold and may be set based on the rating of a power supply of the computing device. In various examples, the upper surge threshold 110 is set to the rating of a power supply (e.g., 65 W, 200 W, etc.).

In response to detecting that the time-averaged power consumption 108 of the computing device exceeds the first threshold 110, the instructions 102 decrease an operational power of the processor 104 from the processor's normal operating power. The instructions 102 may issue a command 112 to the processor 104 to control the processor to reduce its operating power to below normal. Examples of reduced operating powers include 75%, 80%, and 85% of normal operating power. Such example reduced operating powers may be significantly higher than the lowest operating power of the processor 104, such as may be achieved with PROCHOT#.

The time-averaged power consumption 108 exceeding the first threshold 110 may be considered a power surge. A surge may be triggered by various events, such as plugging in a peripheral device, launching a resource-demanding application, and similar. The instructions 102 initially respond to the power surge by reducing the operational power of the processor 104 by an amount that helps reduce total power demand of the computing device without reducing performance of the processor 104 to an extreme low level, as would occur with PROCHOT#. The instructions 102 initially responding to the time-averaged power consumption 108 exceeding the first threshold 110 may be considered the beginning of a surge recovery period.

The instructions 102 then start monitoring an instantaneous power consumption 114 of the computing device to determine whether to make a further decrease or possibly an increase to the operational power of the processor 104. That is, during the surge recovery period, the instructions determine whether the instantaneous power consumption 114 of the computing device indicates that the time-averaged power consumption 108 is expected to drop sufficiently to end the surge. Since the instantaneous power consumption 114 of the computing device leads the time-averaged power consumption 108, the instructions 102 may control the operational power of the processor 104 based on the instantaneous power consumption 114 of the computing device to cause the time-averaged power consumption 108 to reach a non-surge level. The instructions 102 may control 116 the operational power of the processor 104 using incremental decreases and increases, so as to have a moderated effect on processor 104 performance.

In other words, the time-averaged power consumption 108 of the computing device triggers a surge and begins the surge recovery period, during which the instantaneous power consumption 114 of the computing device is monitored. The operational power of the processor 104 may be controlled incrementally during the surge recovery period in response to the instantaneous power consumption 114, so as to drive the time-averaged power consumption 108 down to end the surge without undue degradation of performance of the processor 104.

The instructions 102 may control the operational power of the processor 104 to cause the instantaneous power consumption 114 of the computing device to stay within a recovery band that may be defined by upper and lower recovery thresholds. The recovery band may be set to end the surge while still allowing the processor 104 to provide adequate performance.

The instructions 102 may further detect when the time-averaged power consumption 108 drops sufficiently (e.g., below a lower surge threshold) to end the surge recovery period. The instructions 102 may then return the processor to its normal operating power and stop monitoring the instantaneous power consumption 114 of the computing device.

Accordingly, a power surge is initially addressed by reducing processor power significantly but not to its minimum. Then, the computing device's instantaneous power demand is monitored to adjust processor power to provide continued compensation for the surge while allowing the processor to provide near expected performance. As such, a user of the computing device may not perceive the surge as a sudden or jarring reduction in performance and may not even notice the surge or its recovery.

Figure 2:
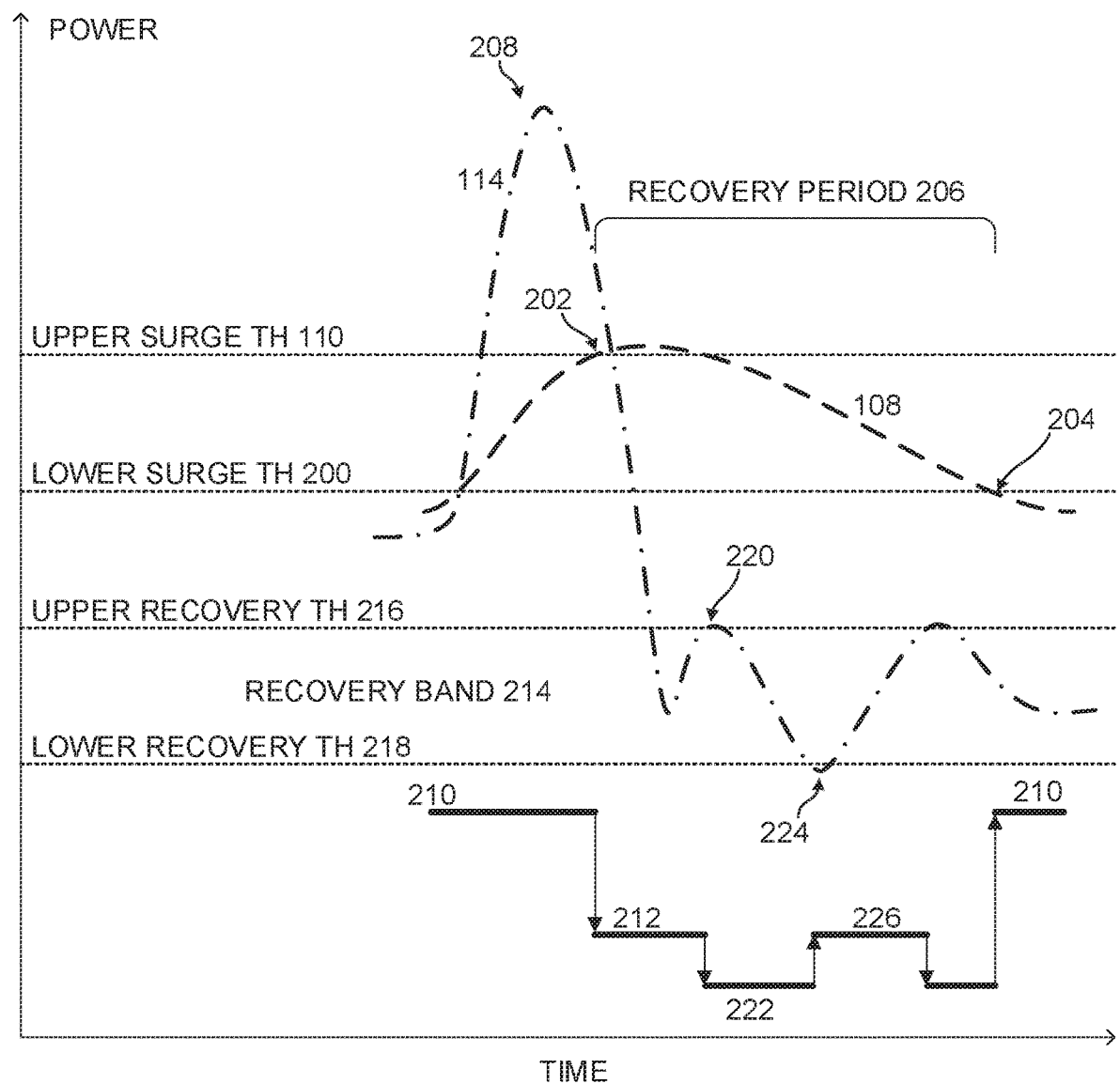
FIG. 2 is a graph of example thresholds to control power surge recovery in a computing device by controlling operational power of a processor of the computing device.

FIG. 2 shows example thresholds to control power surge recovery in a computing device by controlling operational power of a processor of the computing device.

A time-averaged power consumption 108 of the computing device is compared to a first threshold or upper surge threshold 110 and a second threshold or lower surge threshold 200. If the time-averaged power consumption 108 exceeds the upper surge threshold 110, for example at time 202, then a power surge event may be determined to be occurring. If the time-averaged power consumption 108 falls below the lower surge threshold 200, for example at time 204, then the power surge event may be determined to be over. The period between the time-averaged power consumption 108 exceeding of the upper surge threshold 110 and then reaching the lower surge threshold 200, that is between times 202 and 204, may be referred to as a recovery period 206.

The time-averaged power consumption 108 may be computed by averaging an instantaneous power consumption 114 provided to the components of the computing device, including the processor, by the computing device's power supply over an immediately preceding duration. For example, readings of the instantaneous power consumption 114 over the last N seconds (e.g., N=5, 10, or 15) may be averaged to obtain the time-averaged power consumption 108. The time-averaged power consumption 108 may be updated each time an instantaneous power consumption 114 reading is taken.

The instantaneous power consumption 114 of the computing device may be ignored for purposes of surge recovery until a surge is detected by the time-averaged power consumption 108 surpassing the upper surge threshold 110. Using the time-averaged power consumption 108 to detect surges allows for intermittent spikes in the instantaneous power consumption 114, such as spike 208, to be ignored because a spike may exceed the upper surge threshold 110 for a short time and may not be considered a surge provided that the time-averaged power consumption 108 does not meet or exceed the upper surge threshold 110. Transient fluctuations above the upper surge threshold 110 may be tolerated to avoid overcompensating and unduly degrading processor performance.

Prior to detection of a surge, the processor may be operating at normal operating power 210. Upon detection of a surge at time 202, the processor may be switched immediately to a reduced operating power 212. The reduced operating power 212 may be selected to bring the instantaneous power consumption 114 of the computing device down to around a recovery band 214 bounded by third and fourth thresholds or upper and lower recovery thresholds 216, 218.

The instantaneous power consumption 114 of the computing device is then monitored and kept within the recovery band 214, or as close thereto as practical, by controlling the operational power of the processor. If the instantaneous power consumption 114 exceeds the upper recovery threshold 216, for example at time 220, then the power of the processor may be decremented by an amount to a lower power level 222. If the instantaneous power consumption 114 falls below the lower recovery threshold 218, for example at time 224, then the power of the processor may be incremented by an amount to a higher power level 226.

Testing the instantaneous power consumption 114 against the upper and lower recovery thresholds 216, 218 may be performed regularly or periodically. Incremental increases and decreases in the setting of the processor power may be a preset amount. Incremental increases may have the same absolute magnitude as incremental decreases or may be different in magnitude.

Tuning the operational processor power to keep instantaneous power consumption 114 of the computing device within the recovery band 214 helps pull the time-averaged power consumption 108 down steadily to end the surge while still providing expected or reasonable processing power. Once the surge is over, for example at time 204, the processor may be returned to normal operation power 210 and monitoring of the instantaneous power consumption 114 of the computing device may cease until the next surge is detected.

The thresholds 110, 200, 216, 218 may be selected based on the power rating or maximum allowed output of power supply of the computing device and further with regard to a maximum time desirable for the recovery period 206. The upper surge threshold 110 may be set to the rating of the power supply. The lower surge threshold 200 may be set to value lower than the upper surge threshold 110, for example between 90% to 95% of the rating of the power supply. In the example of a 65 W power supply the upper surge threshold 110 may be set to 65 W and the lower surge threshold 200 may be set to 3.5 W or 4 W lower, i.e., 61.5 W or 61 W.

The upper recovery threshold 216 may be set to an amount lower than the lower surge threshold 200, such as 3.5, 5.0, or 6.5 W lower. For example, the upper recovery threshold 216 may be set to 5.0 W lower, such as 56.5 W.

The lower recovery threshold 218 may be set to an amount lower than upper recovery threshold 216, such as 3.5, 5.0, or 6.5 W lower. For example, the lower recovery threshold 218 may be set to 5.0 W lower, such as 51.5 W.

Testing the instantaneous power consumption 114 against the upper and lower recovery thresholds 216, 218 may be performed every 1 second, 2 seconds, or 3 seconds. Incremental changes in the processor power setting may be a preset amount, such as 2 W, 2.5 W, or 3 W.

The above numerical examples are for an example 65-Watt power supply. Power supplies of other ratings may be provided with suitable thresholds and other values using the teachings provided herein.

Figure 3:
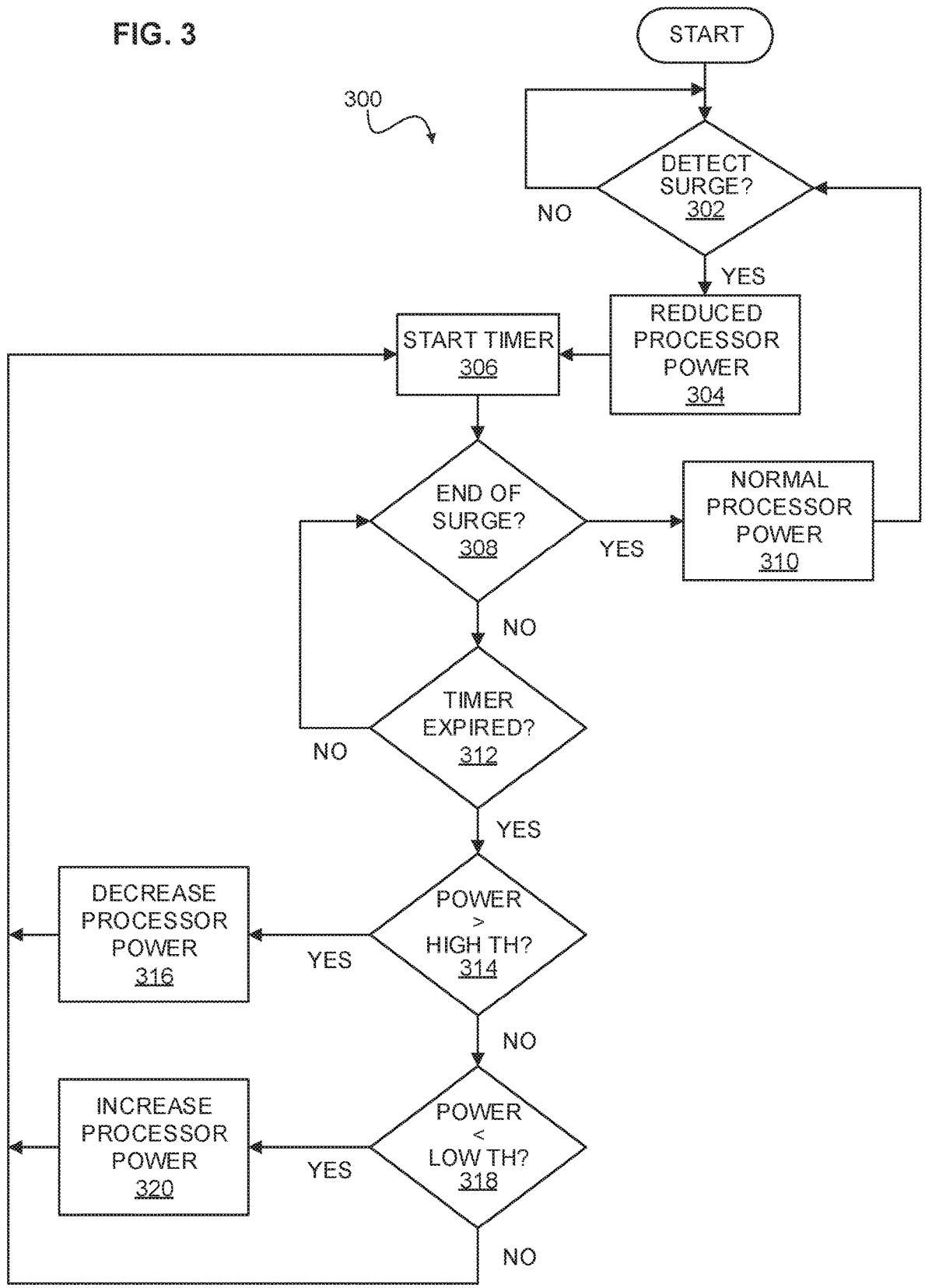
FIG. 3 is a flowchart of an example method of controlling power surge recovery in a computing device by controlling operational power of a processor of the computing device.

FIG. 3 shows a flowchart of an example method 300 of controlling power surge recovery in a computing device by controlling operational power of a processor of the computing device. The method 300 may be implemented by instructions that may be stored in a non-transitory computer-readable medium and that may be executable by a processor.

At block 302, monitoring for a power surge is performed. A surge may be detected when a time-averaged power consumption of the computing device, as delivered by a power supply, exceeds an upper surge threshold.

At block 304, in response to detecting a power surge, the operational power of the processor of the computing device is reduced to below the normal operating power. The processor's power may be set to a level below a normal operating setting. This shortly begins to bias the time-averaged power consumption lower, so as to end the surge.

At block 306, a timer is started to determine when to check the instantaneous power consumption of the computing device. The timer establishes a time delay or frequency at which the instantaneous power consumption of the computing device is checked. Hence, while the detection of the start and end of a power surge is made with reference to the time-averaged power consumption of the computing device, fine-tuned control of the operational power of the processor during the surge is performed regularly or periodically with reference to the instantaneous power consumption of the computing device.

At block 308, the time-averaged power consumption of the computing device is compared to a lower surge threshold to determine if the surge is over.

At block 310, the surge is determined to be over in response to detecting that the time-averaged power consumption falls below the lower surge threshold. The operational power of the processor is returned to the normal operating power. The timer may be stopped or ignored as there will be no more checks of the instantaneous power consumption of the computing device for surge recovery purposes.

At block 312, if the time-averaged power consumption still exceeds the lower surge threshold, the surge is not yet over and the timer is checked for expiry, at block 312.

When the timer expires, the method 300 determines whether a further decrease or an increase to the operational power of the processor is useful to continue to bring the time-averaged power consumption lower while allowing effective operation of the processor. The instantaneous power consumption of the computing device may be compared to a recovery band that is established below the lower surge threshold. If the instantaneous power consumption is outside the recovery band, then the operational power of the processor is incrementally adjusted to bias the instantaneous power consumption to return to the recovery band. Blocks 314-320 are considered whenever the timer expires, so that incremental adjustment of the operational power of the processor is performed regularly or periodically. In various examples, an incremental adjustment is considered multiple times during a surge.

At block 314, if the instantaneous power consumption of the computing device exceeds an upper recovery threshold of the recovery band, then the operational power of the processor is decreased by an increment, at block 316. The incremental decrease aims to bring the instantaneous power consumption below the upper recovery threshold and back into the recovery band. Blocks 314, 316 therefore serve to bring the surge to a quicker end.

Conversely, at block 318, if the instantaneous power consumption of the computing device falls below a lower recovery threshold of the recovery band, then the operational power of the processor is increased by an increment, at block 320. This incremental increase aims to bring the instantaneous power consumption above the lower recovery threshold and back into the recovery band. Blocks 318, 320 therefore allow increased processing power without unduly extending the duration of the surge.

If, at blocks 314 and 318, the instantaneous power consumption of the computing device does not violate the upper and lower recovery thresholds, then the instantaneous power consumption is determined to be within the recovery band and no adjustment to the operational power of the processor is made.

After blocks 314 and 318 are considered, the timer is restarted, at block 306, and blocks 308 and 312-320 are repeated until the surge is determined to be over.

Figure 4:
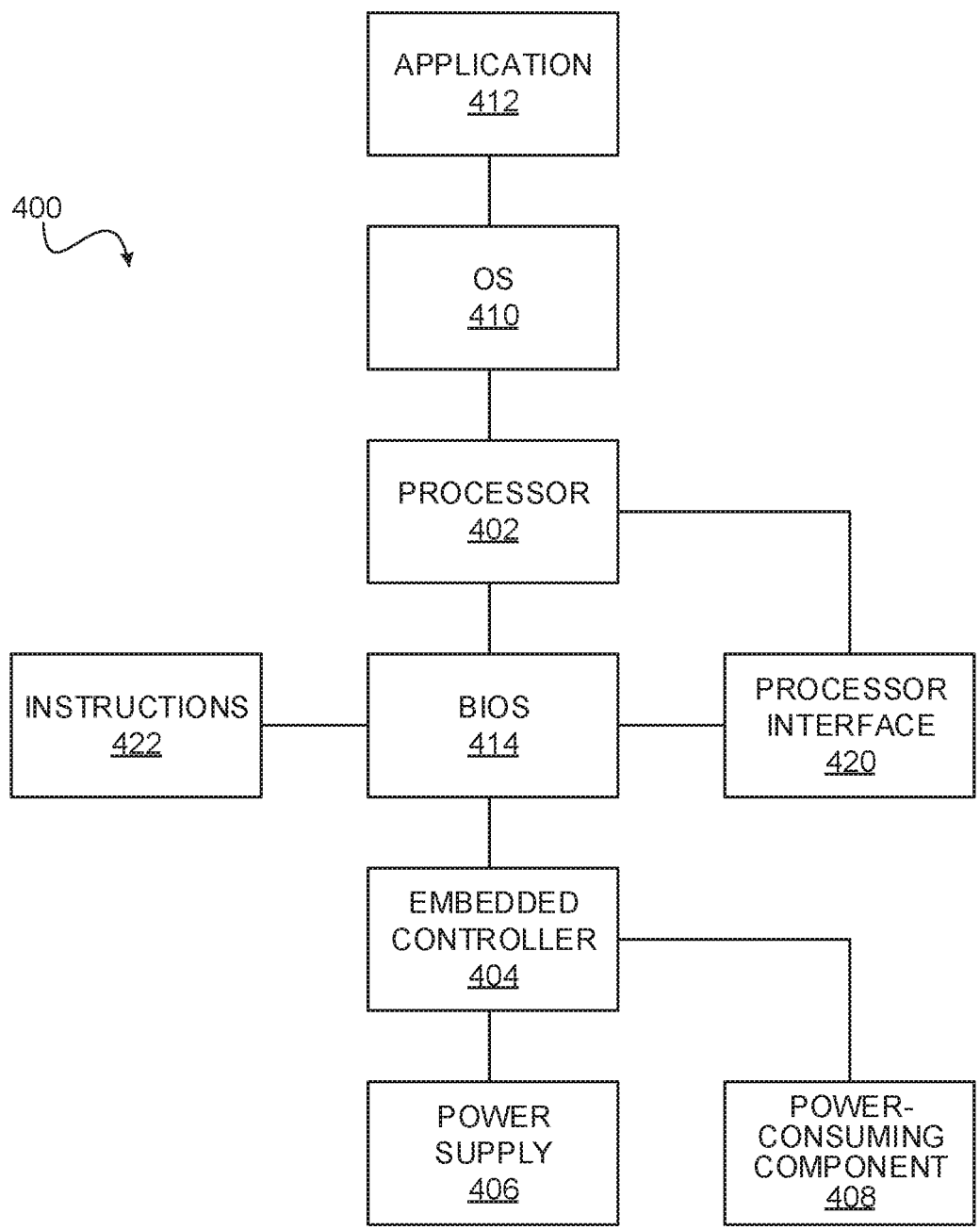
FIG. 4 is a block diagram of an example computing device to control power surge recovery by controlling operational power of a processor.

FIG. 4 shows an example computing device 400 to control power surge recovery by controlling operational power of a processor. The computing device 400 is an example that may be used with the non-transitory computer-readable medium 100 of FIG. 1, the thresholds of FIG. 2, the method 300 of FIG. 3, and/or other techniques discussed herein. Like terminology and reference numerals denote like components for which detail will not be repeated below.

The computing device 400 includes a processor 402, an embedded controller (EC) 404, a power supply 406, and various power-consuming components 408, such as a serial bus as discussed elsewhere herein.

The processor 402 may execute an operating system (OS) 410, applications 412, and a Basic Input/Output System (BIOS) 414.

The embedded controller 404 may include a microcontroller or other processor. The embedded controller 404 may include or have access to a non-transitory computer-readable medium, such as RAM, EEPROM, and/or ROM, that stores instructions executable by the embedded controller 404. The embedded controller 404 may provide basic operations of the computing device 400, such as monitoring temperature, monitoring power, monitoring fan speed, capturing keyboard input, and similar.

The embedded controller 404 may be connected to the power supply 406 to monitor power outputted by the power supply as the instantaneous power consumption of the computing device 400. The embedded controller 404 may include instructions that compute a time-averaged power consumption of the computing device 400 based on the sensed instantaneous power consumption.

The power supply 406 may include a transformer, rectifier, voltage regulator, and/or similar components to convert wall/main power, such as 110 VAC at 60 Hz, to power usable by the computing device 400, such as 19, 5, or 3.3 VDC. The power supply may be referred to as a power support unit (PSU) and may be internal or external to the computing device 400 or may include components that are internal and external to the computing device 400.

The BIOS 414 may include instructions, such as software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS 410 of a computing device 400. A BIOS may initialize, control, or operate components such as hardware components of a computing device 400 and may load or boot the OS 410.

In some examples, a BIOS 414 may provide or establish an interface between hardware devices or platform firmware of the computing device and an OS of the computing device. The OS of the computing device may control or operate hardware devices or platform firmware of the computing device through the BIOS. In some examples, a BIOS 414 may implement the Unified Extensible Firmware Interface (UEFI) specification or another specification or standard for initializing, controlling, or operating a computing device 400.

The computing device 400 may further include a processor interface 420. The processor 402 may have functionality that is accessible through the processor interface 420. Such functionality may include setting an operational power level of the processor 402 during operation of the computing device 400.

The processor interface 420 may enforce a security protocol that requires authentication/authorization to enable, disable, or modify certain functions of the processor.

The BIOS 414 may connect to the processor interface 420 and issue a command to set an operational power of the processor 402, such as a normal operating power, a reduced operation power, or an incrementally changed operating power, as described in detail elsewhere herein.

The computing device 400 further includes instructions 422 executable by the processor 402 to control the operational power of the processor to detect and end a power surge. The instructions 422 may be part of the BIOS 414. In addition or alternatively, some or all of the instructions 422 may be executable by the embedded controller 404.

Figure 5:
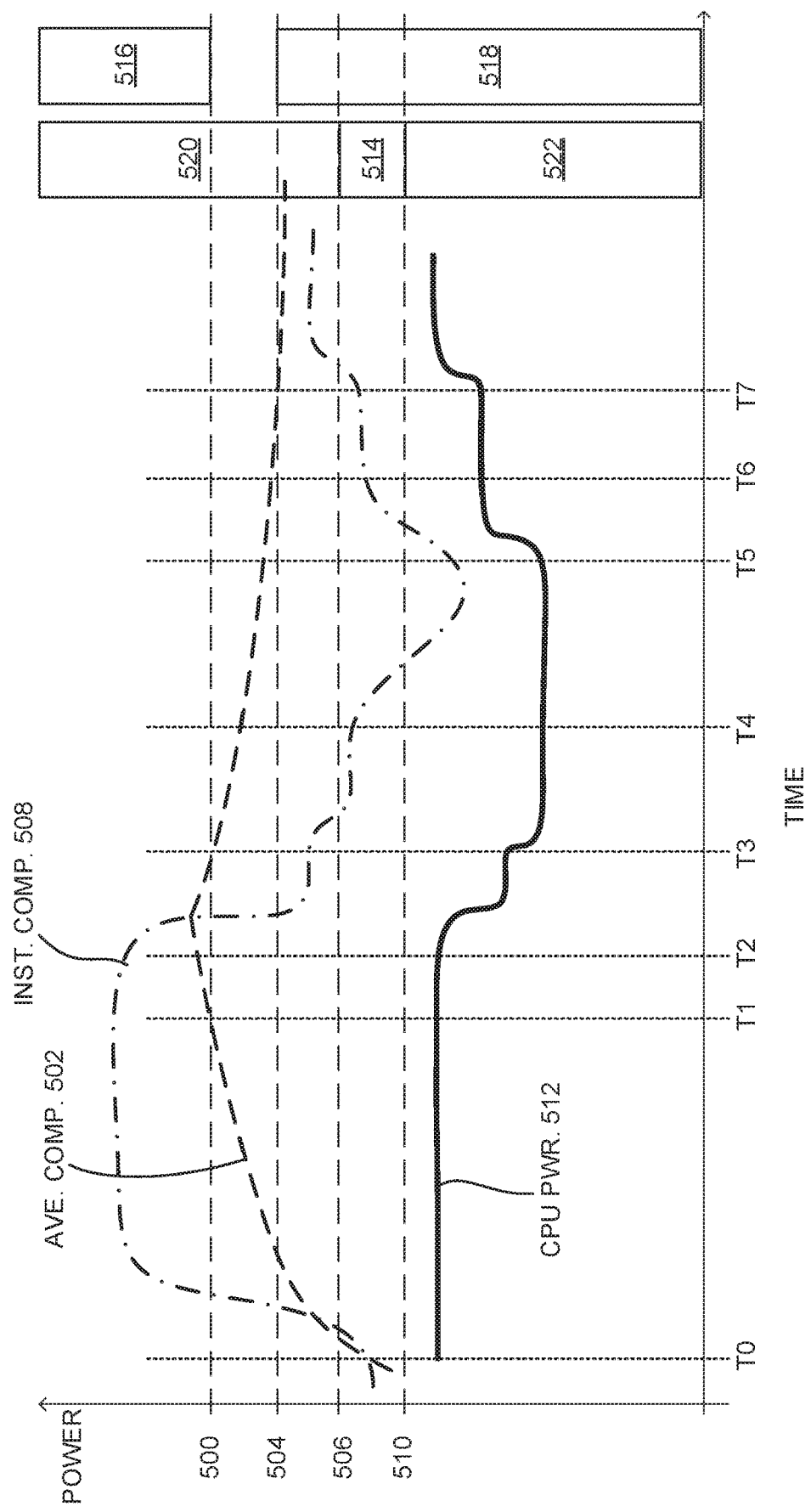
FIG. 5 is a plot of an example of controlling power surge recovery in a computing device by controlling operational power of a processor of the computing device.

FIG. 5 shows an example plot of controlling power surge recovery in a computing device by controlling operational power of a processor of the computing device.

A first threshold 500 is set to detect a power surge exceeded by an average power consumption 502 of the computing device over a recent duration.

A second threshold 504 is set lower than the first threshold 500 to determine that the surge is over when the average power consumption 502 falls below the second threshold 504.

A third threshold 506 is set below the second threshold 504 to provide an upper limit for an instantaneous power consumption 508 of the computing device.

A fourth threshold 510 is set below the third threshold 506 to provide a lower limit for the instantaneous power consumption 508 of the computing device.

In the example shown, at time T0 a power spike begins. The instantaneous power consumption 508 of the computing device rises sharply and the time-averaged power consumption 502 rises gradually. At time T1, a surge is detected when the time-averaged power consumption 502 exceeds the first threshold 500. Had the instantaneous power consumption 508 fallen below the first threshold 500 before this time, the time-averaged power consumption 502 may not have exceeded the first threshold 500. In response to the detection of the surge, the power delivered to the processor 512 is reduced from its normal operating level at around time T2. This reduces the instantaneous power consumption 508 of the computing device with the time-averaged power consumption 502 following. Times T3-T6 represent times that the instantaneous power consumption 508 of the computing device is checked against the third and/or fourth thresholds 506, 510 to determine whether the instantaneous power consumption 508 is within, above, or below a recovery band 514 defined by the third and fourth thresholds 506, 510. At time T3, the instantaneous power consumption 508 of the computing device is determined to be above the third threshold 506 and therefore outside the recovery band 514. Accordingly, the operational power of the processor 512 is decremented by an amount. At time T4, the instantaneous power consumption 508 of the computing device is determined to be below the third threshold 506 and above the fourth threshold 510, and therefore inside the recovery band 514. Thus, no change is made to the operational power of the processor 512 at this time. Subsequently, at time T5, the instantaneous power consumption 508 of the computing device is determined to be below the fourth threshold 510 and therefore outside the recovery band 514. In response, the operational power of the processor 512 is incremented by an amount. At time T6, the instantaneous power consumption 508 of the computing device is determined to be within the recovery band 514, so no change is made to the operational power of the processor 512. Lastly, at time T7, the time-averaged power consumption 502 falls below the second threshold 504, and the surge is determined to be over. As such, the operational power of the processor 512 may be returned to its normal operation level. After time T7, the instantaneous power consumption 508 of the computing device may rise without triggering further change in the operational power of the processor 512, until another surge is detected based on the time-averaged power consumption 502.

FIG. 5 shows the recovery band 514 as well as additional power bands. When the time-averaged power consumption 502 of the computing device is in a surge band 516 that is above the first threshold 500, then a surge condition exists until the time-averaged power consumption 502 enters an end-surge band 518 that is below the second threshold 504. During a surge, the operational power of the processor 512 is a) reduced when the instantaneous power consumption 508 of the computing device is in a reduce-power band 520 that is above the recovery band 514, b) increased when the instantaneous power consumption 508 of the computing device is in an increase-power band 522 that is below the recovery band 514, and left unchanged when the instantaneous power consumption 508 of the computing device is in the recovery band 514.

In view of the above, it should be apparent that effective surge reduction for a computing device's power supply may be provided by controlling a power setting of a processor of the computing device without undue decrease in performance and, in many instances, without notice by the user.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A non-transitory computer-readable medium comprising instructions to:
monitor a time-averaged power consumption of a computing device that includes a plurality of power-consuming components including a processor;
compare a first reading of the time-averaged power consumption to a first threshold to detect if the first reading of the time-averaged power consumption exceeds the first threshold;
in response to detecting that the first reading of the time-averaged power consumption of the computing device exceeds the first threshold at a first time:
decrease an operational power of the processor from a normal operating power level to a second operating power level that is lower than the normal operating power level; and
start monitoring an instantaneous power consumption of the computing device to determine whether to further adjust the operational power of the processor; and
in response to detecting that a second reading of the time-averaged power consumption of the computing device does not exceed a second threshold that is lower than the first threshold at a second time that occurs after the first time:
return the operational power of the processor to the normal operating power level; and
stop monitoring the instantaneous power consumption of the computing device.

2. The non-transitory computer-readable medium of claim 1, wherein the instructions are further to:
in response to detecting that a first reading of the instantaneous power consumption of the computing device does not exceed a third threshold at a third time that occurs between the first time and the second time, increase the operational power of the processor from the second operating power level to a third operating power level that is lower than the normal operating power level.

3. The non-transitory computer-readable medium of claim 2, wherein the third threshold is lower than the second threshold.

4. The non-transitory computer-readable medium of claim 1, wherein the instructions are further to:
in response to detecting that a second reading of the instantaneous power consumption of the computing device does exceed a fourth threshold at a fourth time that occurs between the first time and the second time, decrease the operational power of the processor from the second operating power level to a fourth operating power level that is lower than the second operating power level.

5. The non-transitory computer-readable medium of claim 4, wherein the fourth threshold is lower than the second threshold.

6. The non-transitory computer-readable medium of claim 1, wherein:
the instructions are executable by the processor; and
the instructions are further to query an embedded controller of the computing device to detect if the first reading of the time-averaged power consumption of the computing device exceeds the first threshold.

7. The non-transitory computer-readable medium of claim 1, wherein the instructions are further to:
in response to detecting that a first reading of the instantaneous power consumption of the computing device does not exceed a third threshold at a third time that occurs between the first time and the second time, increase the operational power of the processor from the second operating power level to a third operating power level that is lower than the normal operating power level; and
in response to detecting that a second reading of the instantaneous power consumption of the computing device does exceed a fourth threshold that is higher than the third threshold at a fourth time that occurs between the first time and the second time, decrease the operational power of the processor from the second operating power level to a fourth operating power level that is lower than the normal operating power level.

8. A computing device comprising:
a power supply; and
a processor connected to the power supply, the processor operable at a normal operating power level, the processor to:
in response to detecting a power surge by detecting that a first reading of a time-averaged power delivered by the power supply exceeds a first threshold at a first time:
decrease an operational power of the processor to a second operating power level that is lower than the normal operating power level; and
start monitoring an instantaneous power delivered by the power supply during the power surge to determine whether to further adjust the operational power of the processor; and
in response to detecting that the power surge has ended by detecting that a second reading of the time-averaged power delivered by the power supply does not exceed a second threshold that is lower than the first threshold at a second time that occurs after the first time:
increase the operational power of the processor to the normal operating power level; and
stop monitoring the instantaneous power delivered by the power supply.

9. The computing device of claim 8, wherein, during the power surge, the processor is further to:
in response to detecting that a first reading of the instantaneous power delivered by the power supply does not exceed a third threshold at a third time that occurs between the first time and the second time, increase the operational power of the processor from the second operating power level to a third operating power level that is lower than the normal operating power level.

10. The computing device of claim 9, wherein the third threshold is lower than the second threshold.

11. The computing device of claim 8, wherein, during the power surge, the processor is further to:
in response to detecting that a second reading of the instantaneous power delivered by the power supply does exceed a fourth threshold at a fourth time that occurs between the first time and the second time, decrease the operational power of the processor from the second operating power level to a fourth operating power level that is lower than the normal operating power level.

12. The computing device of claim 11, wherein the fourth threshold is lower than the second threshold.

13. The computing device of claim 8, wherein the processor is to query an embedded controller of the computing device to detect the power surge.

14. The computing device of claim 8, wherein the processor is to:
in response to detecting that a first reading of the instantaneous power delivered by the power supply does not exceed a third threshold at a third time that occurs between the first time and the second time, increase the operational power of the processor from the second operating power level to a third operating power level that is lower than the normal operating power level; and
in response to detecting that a second reading of the instantaneous power delivered by the power supply does exceed a fourth threshold that is higher than the third threshold at a fourth time that occurs between the first time and the second time, decrease the operational power of the processor from the second operating power level to a fourth operating power level that is lower than the normal operating power level.

15. A non-transitory computer-readable medium comprising instructions to:
monitor a time-averaged power consumption of a computing device to detect a power surge;
in response to detecting the power surge by detecting that a first reading of the time-averaged power consumption of the computing device exceeds a first threshold at a first time:
decrease an operational power level of a processor of the computing device to a second operating power level that is both lower than a normal operating power level of the processor and higher than a minimum operating power level of the processor; and
start monitoring an instantaneous power consumption of the computing device to determine whether to further adjust the operational power of the processor;
during the power surge, control the operational power of the processor to maintain the instantaneous power consumption of the computing device within a surge recovery band; and
in response to detecting that the power surge has ended by detecting that a second reading of the time-averaged power consumption of the computing device does not exceed a second threshold that is lower than the first threshold at a second time that occurs after the first time:
return the operational power of the processor to the normal operating power level; and
stop monitoring the instantaneous power consumption of the computing device.

16. The non-transitory computer-readable medium of claim 15, wherein, to maintain the instantaneous power consumption of the computing device within the surge recovery band during the power surge, the instructions are further to:

in response to detecting that a first reading of the instantaneous power consumption of the computing device does not exceed a third threshold at a third time that occurs between the first time and the second time, increase the operational power of the processor from the second operating power level to a third operating power level that is lower than the normal operating power level.

17. The non-transitory computer-readable medium of claim 16, wherein, to maintain the instantaneous power consumption of the computing device within the surge recovery band during the power surge, the instructions are further to:

in response to detecting that a second reading of the instantaneous power consumption of the computing device does exceed a fourth threshold at a fourth time that occurs after the third time and before the second time, decrease the operational power of the processor from the third operating power level to a fourth operating power level that is lower than the third operating power level.

18. The non-transitory computer-readable medium of claim 16, wherein:

the third threshold and the fourth threshold are both lower than the second threshold; and the third threshold is lower than the fourth threshold.

19. The non-transitory computer-readable medium of claim 15, wherein the instructions are further to, in response to detecting that the power surge has ended, stop controlling the operational power of the processor to maintain the instantaneous power consumption of the computing device within the surge recovery band.

20. The non-transitory computer-readable medium of claim 15, wherein the instructions are further to control the operational power of the processor through a processor interface that enforces a security protocol.

* * * * *